United States Patent [19]

Henkel

[11] Patent Number: 5,129,601
[45] Date of Patent: Jul. 14, 1992

[54] JACK SCREW PAYLOAD DEPLOYMENT SYSTEM

[75] Inventor: Edwin E. Henkel, Lakewood, Calif.

[73] Assignee: Rockwell International Corporation, Seal Beach, Calif.

[21] Appl. No.: 754,082

[22] Filed: Sep. 3, 1991

[51] Int. Cl.⁵ .............................................. B64G 1/64
[52] U.S. Cl. ............................. 244/158 R; 244/161; 89/1.54; 254/98; 124/1; 74/89.15; 74/424.8 A
[58] Field of Search ................ 244/158 R, 161, 137.1, 244/137.4; 89/1.54; 74/89.15, 424.8 A; 254/85, 98, 100, DIG. 7, 7 R, 7 B; 124/1, 81–82; 221/75

[56] References Cited

U.S. PATENT DOCUMENTS

| | | | |
|---|---|---|---|
| 1,304,680 | 5/1919 | Hart | 254/7 B |
| 1,346,997 | 7/1920 | Van Berkel | 74/424.8 A |
| 2,428,807 | 10/1947 | Mikina | 124/1 |
| 2,528,945 | 11/1950 | Carpenter | 221/75 |
| 2,795,702 | 6/1957 | Morris | 221/72 |
| 2,807,193 | 9/1957 | Robert et al. | 244/137.4 |
| 2,921,501 | 1/1960 | Parot | 244/137.4 |
| 3,773,217 | 11/1973 | Schlaf | 221/75 |
| 4,355,775 | 10/1982 | Ganssle | 244/158 R |
| 4,375,770 | 3/1983 | Druet | 74/424.8 A |
| 4,391,423 | 7/1983 | Pruett et al. | 244/161 |
| 4,572,053 | 2/1986 | Sosnowski et al. | 244/137.4 |
| 5,012,687 | 5/1991 | Hoshide | 74/89.15 |

Primary Examiner—Galen Barefoot
Attorney, Agent, or Firm—Lawrence N. Ginsberg; Charles T. Silberberg

[57] ABSTRACT

The deployment system comprises a plurality of parallel jack screws securely supported at their respective bases to a deployment portion of the spacecraft. The jack screws are rotatable with respect to that deployment portion. A synchronization chain is connected to the jack screws to insure precise timing between the screws. An electric motor provides rotation of the jack screws. A payload is provided having attach fittings located thereon for engagement with the jack screws. Prior to deployment, the payload is mounted to the jack screws. During deployment, synchronous rotation of the jack screws is provided allowing the payload to translate off the ends of the jack screws. Thus, the jack screws simultaneously serve as guides for the payload, providing a precise trajectory, and providing the driving force to eject the payload from the spacecraft.

5 Claims, 3 Drawing Sheets

JACK SCREW PAYLOAD DEPLOYMENT SYSTEM

STATEMENT OF GOVERNMENT INTEREST

This invention was made with Government support under contract No. F04701-89-C-0005-S awarded by the U.S. Air Force. The Government has certain rights in this invention.

BACKGROUND OF THE INVENTION

1. Field of the Invention

The present invention relates to the deployment of payloads from spacecraft.

2. Description of the Related Art

Most of the devices presently used for deploying payloads from spacecraft depend on pyrotechnic devices, frequently utilizing spring-loaded pistons to impart necessary separation velocities. Such devices result in a relatively short separation stroke necessitating the use of relatively high forces. This, combined with uncertainties in the payloads center of mass, often results in undesirable tip off rates. Additionally, spring failure scenarios often dictate wide design margins to insure no re-contact of space vehicles.

OBJECTS AND SUMMARY OF THE INVENTION

It is, therefore, a principal object of the present invention to deploy payloads using low acceleration forces with minimum tip off rates.

Another object is to provide a safe deployment system and one which obviates the need for pyrotechnic devices.

These objects are achieved by the present invention which is a payload deployment system for a space craft. In its broadest aspects, the deployment system comprises a plurality of parallel jack screws securely supported at their respective bases to a deployment portion of the spacecraft. The jack screws are rotatable with respect to that deployment portion. A synchronization chain is connected to the jack screws to insure precise timing between the screws. Electric motor means provide rotation of the jack screws. A payload is provided having attach fittings located thereon for engagement with the jack screws. Prior to deployment, the payload is mounted to the jack screws. During deployment, synchronous rotation of the jack screws is provided allowing the payload to translate off the ends of the jack screws. Thus, the jack screws simultaneously serve as guides for the payload, providing a precise trajectory, and providing the driving force to eject the payload from the spacecraft.

The use of these jack screws for deployment constrains payload motion to translation only. There are no initial rotational velocities, regardless of the payload's center of mass properties. Use of a synchronizing chain mechanically distributes the deployment forces to the jack screws according to the payload mass properties. Thus, the resultant deployment parameters of the payload are independent of the payload center of mass.

In its more narrower aspects, the system further includes at least one end support member depending from the deployment portion and attached to the end of each jack screw for providing support to the end of the jack screw. This increases the critical speed of each jack screw. Similar support members may be included at intermediate portions of the jack screw for allowing a further increase in the critical speed of each jack screw.

Other objects, advantages and novel features of the present invention will become apparent from the following detailed description of the invention when considered in conjunction with the accompanying drawings.

BRIEF DESCRIPTION OF THE DRAWINGS

The same elements or parts throughout the figures are designated by the same reference characters.

DETAILED DESCRIPTION OF THE PREFERRED EMBODIMENTS

Figure 1:
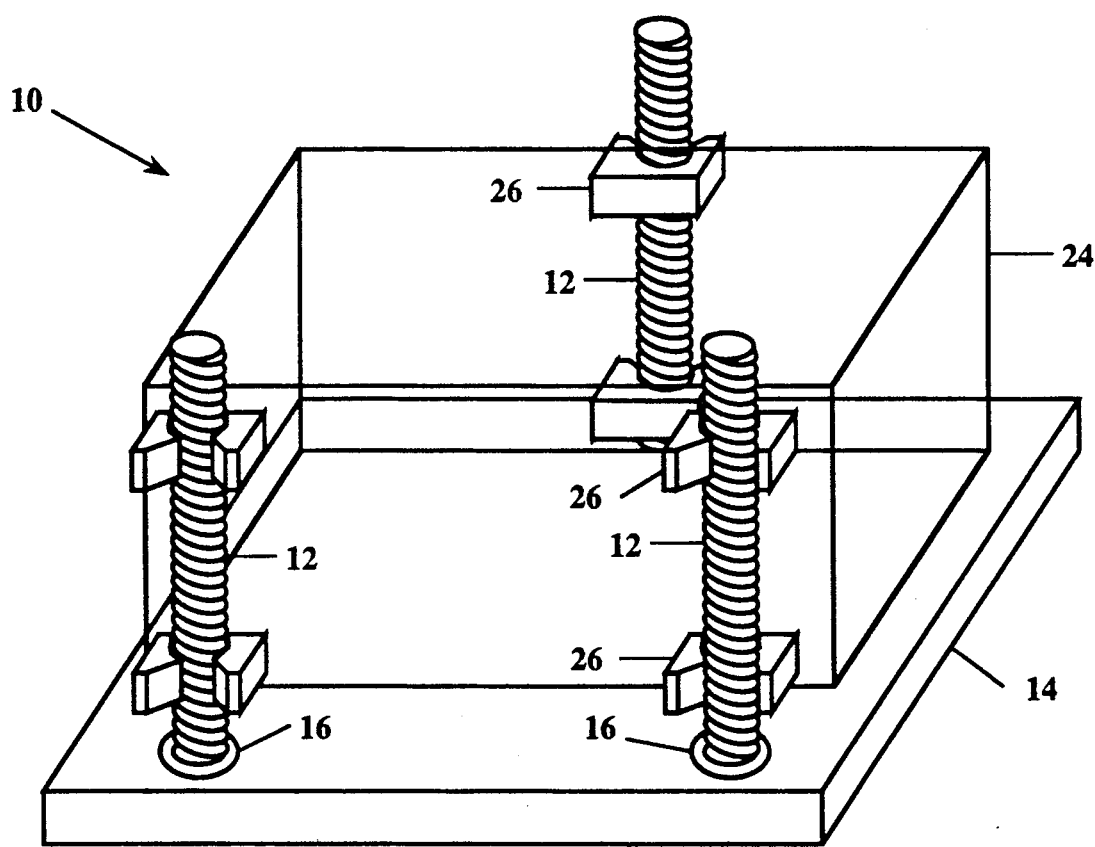
FIG. 1 is a top isometric view of the deployment system of the present invention.

Referring to the drawings and characters of reference marked thereon, FIG. 1 illustrates the deployment system of the present invention designated generally as 10. Three parallel, spaced jack screws 12 are securely supported at their respective bases to a deployment portion 14 of a spacecraft. As can be seen in the figures, the jack screws 12 are supported at their respective bases by bearings 16 so as to be rotatable with respect to the deployment portion 14. A synchronization chain 18 is connected to the jack screws 12 to insure precise timing between the jack screws 12. The synchronization chain 18 is driven by an electric motor 20 and associated gear box 22. The desired deployed parameters of the payload are tailored by the combination of the motor parameters, the gear box gearing ratio, the length of the jack screws and the lead of the jack screws.

Figure 2:
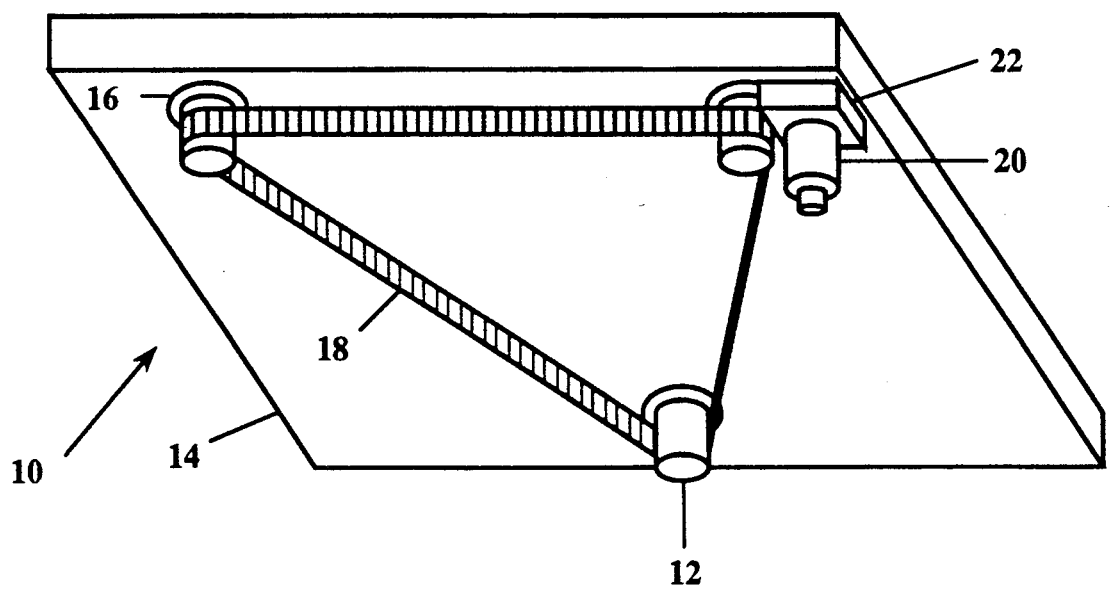
FIG. 2 is a bottom isometric view of the deployment system illustrated in FIG. 1.

Although FIG. 2 illustrates the use of a single electric motor/gear box combination for specific applications, multiple motors may be desired or required.

Referring again to FIG. 1, a payload 24 is utilized which has attach fittings 26 securely attached thereto for engagement with the jack screws 12.

Prior to deployment, the payload 24 is mounted to the jack screws 12 as illustrated in FIG. 1. During deployment, synchronous rotation of the jack screws 12 is provided allowing the payload to translate off the ends of the jack screws 12. The translation is driven by the electric motor 20. As the deployment sequence is initiated, the electric motor 20 starts rotating jack screws 12, accelerating the payload 24 along the motor's rotational speed will increase until the system reaches a final operational speed. The translation of the payload 24 will then be at a constant linear velocity. Thus, the payload 24 will then be deployed off the ends of the jack screws 12 at that constant velocity.

Figure 3:
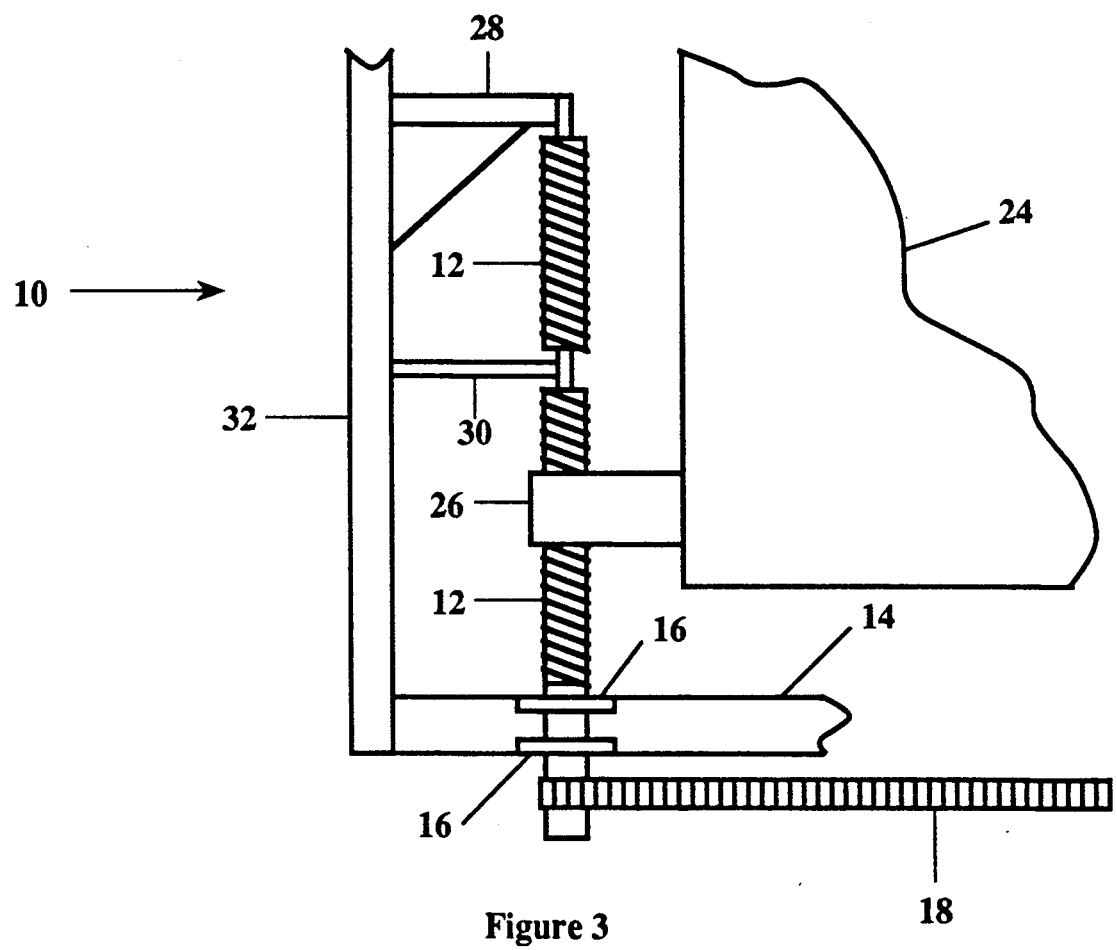
FIG. 3 is a schematic representation of a single jack screw illustrating the use of support members to increase the critical speed of the screw.

During deployment of the payload, the system is operated at speeds below the critical speeds of the jack screws 12. For certain applications, it may be desired to increase the critical speed of the jack screws 12. This can be accomplished by use of an end support member, designated as 28 in FIG. 3. Additionally, an intermediate support 30 may be utilized if desired. The end support member 28 depends from a vertical member 32 attached to the deployment portion 14. As can be seen in FIG. 1, the attach fittings 26 do not completely enclose the jack screws 12, allowing the fittings 26 to translate past the end attach fitting 28.

In a similar manner, the attach fittings 26 would translate past any intermediate support members 30 which are also securely attached to vertical support 32.

Obviously, many modifications and variations are possible in light of the above teachings. It is therefore to be understood that, within the scope of the appended claims, the invention may be practiced otherwise than as specifically described. For example, FIG. 1 illustrates the use of three jack screws. This is preferable because it facilitates enveloping the center of mass of the payload with the deployment forces induced by the jack screws 12. However, this may not always be a necessity. The use of fewer screws, with or without the use of an inert guide rail, would still incorporate the principles embodied by the present invention. Additionally, some applications may deem it necessary to utilize more than three jack screws.

What is claimed and desired to be secured by Letters Patent of the United States is:

1. A payload deployment system for a spacecraft, comprising:
   a) a plurality of parallel jack screws securely supported at their respective bases to a deployment portion of said spacecraft, said jack screws being rotatable with respect to said deployment portion;
   b) a synchronization chain connected to said jack screws to insure precise timing between said screws;
   c) electric drive motor means for providing rotation of said jack screws; and
   d) payload attach fittings being securely attached to said payload for engagement with said jack screws, wherein prior to deployment the payload is mounted to jack screws and during deployment synchronous rotation of jack screws is provided, allowing the payload to translate off the ends of said jack screws, said jack screws simultaneously serving as guides for said payload, providing a precise trajectory and providing the driving force to eject the payload from the spacecraft.

2. The system of claim 1 including three jack screws.

3. The system of claim 1 wherein the leads of the jack screws are substantially identical and compatible with a desired deployment velocity and selected electric motor operational parameters such that the payload experiences substantially zero acceleration at the instance of separation from said jack screws thereby minimizing undesirable tip off rates.

4. The system of claim 1 wherein said attachment fittings do not completely enclose each said jack screws, said system further including:
   at least one end support member depending from said deployment portion and attached to an end of each jack screw for providing support to the end of said jack screw, thereby increasing the critical speed of each jack screw.

5. The system of claim 4 further including at least one intermediate support member dependent from said deployment portion and attached to an intermediate portion of each jack screw for providing intermediate support to said intermediate portion of said jack screw thereby allowing a further increase in the critical speed of each jack screw.

* * * * *